(12) United States Patent
Carlino (10) Patent No.: US 9,095,087 B2
(45) Date of Patent: Aug. 4, 2015

(54) WEED REMOVAL TOOL

(71) Applicant: Thomas Carlino, San Jose, CA (US)

(72) Inventor: Thomas Carlino, San Jose, CA (US)

( * ) Notice: Subject to any disclaimer, the term of this patent is extended or adjusted under 35 U.S.C. 154(b) by 0 days.

(21) Appl. No.: 14/446,100

(22) Filed: Jul. 29, 2014

(65) Prior Publication Data

US 2015/0034889 A1    Feb. 5, 2015

Related U.S. Application Data

(60) Provisional application No. 61/861,425, filed on Aug. 2, 2013.

(51) Int. Cl.
*A01B 1/18* (2006.01)

(52) U.S. Cl.
CPC ........................................ *A01B 1/18* (2013.01)

(58) Field of Classification Search
CPC ............ B66F 5/00; B66F 11/00; B66F 19/00; B66F 2700/12; B66F 7/00; B66F 1/06; B66D 3/00; B66D 3/02; A01B 1/16; A01B 1/165; A01B 1/12
USPC ................ 254/120, 30, 132, 133 R, 134, 2 B; 294/50.9
See application file for complete search history.

(56) References Cited

U.S. PATENT DOCUMENTS

| | | | | | |
|---|---|---|---|---|---|
| 1,075,883 | A | * | 10/1913 | Warren | 254/132 |
| 1,945,311 | A | * | 1/1934 | Gustafson | 294/50.9 |
| 2,178,792 | A | * | 11/1939 | Holmboe | 254/120 |
| 4,181,289 | A | * | 1/1980 | Koffski | 254/107 |
| 4,856,759 | A | * | 8/1989 | Ness | 254/132 |

* cited by examiner

*Primary Examiner* — Lee D Wilson
*Assistant Examiner* — Nirvana Deonauth (57) ABSTRACT

A high performance weed pulling tool for removing the entire weed including the root comprises a rigid frame with a foot, two opposing jaws, a pivoting lever arm and an elongated handle. One jaw is attached to the frame in fixed position and the other jaw is attached to the lever arm. The handle operates the lever arm to close the jaws together and grip the weed stem. The greater handle length relative to the lever arm length below the frame pivot point provides a large gain in gripping and lifting forces. The rear jaw also pivots on the lever arm to conform the jaw surfaces to the taper of the weed stem for maximum surface contact while textured jaw surfaces maximize grip stability. The jaws self-retract when the handle is released allowing tool operation to be repeated rapidly for long periods of time with low fatigue for the operator.

6 Claims, 7 Drawing Sheets

WEED REMOVAL TOOL

CROSS-REFERENCE TO RELATED APPLICATIONS

This is a continuation application of Application No. 61/861,425 filed on 2013 Aug. 1, a provisional application as identified in the accompanying Application Data Sheet.

STATEMENT REGARDING FEDERALLY SPONSORED RESEARCH OR DEVELOPMENT

Not Applicable

REFERENCE TO A SEQUENCE LISTING, A TABLE OR A COMPUTER PROGRAM LISTING COMPACT DISC INDEX

Not Applicable

BACKGROUND OF THE INVENTION

This invention relates to weeding tools, specifically to pulling devices for use in uprooting plants from the soil by gripping the stems.

PRIOR ART

Open space restoration has become an activity of much interest due to increased awareness of disappearing wild lands and open spaces, and the degraded quality of many lands that have been designated as natural preserves. The lands are degraded because typical previous land uses, particularly farming and ranching, employed intensive transformation of the environment to support plants for direct human consumption and feeds for domesticated animals bred for human consumption or as materials for human manufactured products.

As such the native flora and fauna were regarded as useless clutter on the land and were destroyed wholesale in the transformation. A very undesirable consequence of the transformation was the introduction of various plant species, some intentionally, others unintentionally, from distant places that are in natural balance in their native environment but completely out of balance in the transformed environment. The imbalance is due to absence of bio-controls in the transformed environment that are naturally present in the native environment of the introduced species. In other words, nothing eats the introduced plants so they grow out of control and reproduce unchecked to form mono-cultures that exclude virtually all of the native species. The result is a completely out-of-balance ecosystem that desperately needs intervention to help restore the balance.

Examples of intentionally introduced species in North America are Fullers' Teasel, formerly used for processing fibers such as wool for textile materials, and Poison Hemlock as an ornamental. An example of an unintentionally introduced species as contamination in a different seed stock for food plants is Yellow Starthistle. These plants spread rapidly in massive numbers and form dense mono-cultures that exclude all other species not only by their sheer numbers but also sometimes by chemical means with herbicidal substances emitted from their roots.

So it has become imperative to remove the invasive species before native plant restoration can be accomplished successfully. Many methods have been tried and are currently in use including mechanical, chemical and fire controls. Some have been successful and some have not.

The focus of this invention is on the mechanical means, particularly hand tools, of which there have been many varieties. Many of the previous hand tools were designed for similar purposes to that of this invention but not for use on as large of a scale. Most of them were not successful, as is readily evident by the proliferation of such devices in patent history, yet with the obvious absence in the market at the present time of all but the most simple generic brute force tools such as picks and shovels that are the commonly preferred choice. But the simple generic tools require a great amount of manual labor to operate and usually deliver high impact shock and stress to the operator's muscles and skeletal joints, resulting in damage to the physiology of the operator in both the short term and long term.

From analysis of why the more complex and specialized tools have failed to gain acceptance, a few general conclusions can be ascertained. The tools look plausible on paper and in concept, but they don't perform very well in reality, and in particular don't scale up well to the large volumes required for open space restoration. That is mainly because they all have one or more unfavorable characteristics that may seem insignificant at first, but prove to be fatal once they are put to the test in the real world.

One major detriment is excessive weight. Hauling large heavy tools around requires substantial operator strength and causes so much fatigue that even shortly after transport to the work site the operator doesn't have enough energy left to actually do a substantial amount of useful work. Then at the work site, substantial operator strength is required to operate the tool leading to rapid fatigue.

Another highly significant impediment is that many tools require too much maintenance such as removal of extracted plant material from their gripping mechanisms or manual re-opening of closed jaws by the operator after use on each plant, making it impossible to accomplish much in the available work time even when they do operate according to design.

One feature particularly pertinent to this invention is the use of opposing jaws to grip a plant by the stem. Opposing jaws, when both in rigidly attached positions, close together at a fixed relative angle parallel or otherwise to each other, but the plant stems that they are trying to grip have a natural vertical taper that varies from one plant to another and so is inevitably going to be different from the relative closure angle of the jaws most of the time. So the jaws are compelled to concentrate most of their gripping force along a narrow region within their surface area where they first contact the plant stem. That causes the plant stem to be pinched in the contact region, crushing and severing the stem instead of pulling the plant out of the ground.

All of the characteristics described above are not merely conjecture, but rather have been observed directly during development and testing of this invention. That strongly suggests most of the previous designs either performed inadequately or were impractical to use on a large scale such as for open space restoration projects.

The US patent classes found to be the most relevant in the search for previous inventions with similar characteristics to this invention are 172/371, 172/378, 254/132, 294/50.5, 294/50.8 and 294/50.9.

The following references are to previous patents that each exhibit at least one of the above mentioned characteristics.

| US Patent Number | Date | Inventor | Class |
| --- | --- | --- | --- |
| 332,169 | Dec. 08, 1885 | Stocking | 294/50.9 |
| 779,984 | Jan. 10, 1905 | Allen | 254/132 |
| 935,020 | Sep. 28, 1909 | Harvey | 254/132 |
| 961,644 | Nov. 30, 1909 | Miller | 294/50.5 |
| 4,856,759 | Aug. 15, 1989 | Ness | 254/132 |
| 5,535,833 | Jul. 16, 1996 | Mathews | 172/371 |
| 5,743,340 | Apr. 28, 1998 | Giacomini | 172/371 |
| 6,938,937 | Sep. 06, 2005 | Kinney | 294/50.9 |
| 7,063,168 | Jun. 20, 2006 | Paloheimo et al | 172/378 |

SUMMARY OF THE INVENTION

The focus of the invention is an improved manually operated tool for weed removal that increases operator efficiency to better cope with the typical high volumes of invasive weeds that need to be dealt with in degraded open space restoration projects. It has been observed through extensive field testing that most weeds have sufficient stem-to-root bonding strength that they can be fully uprooted from the ground by gripping only the stem and with no ground penetration, provided that a firm enough grip can be achieved on the stem. To that end, this invention provides a greatly improved gripping means to take advantage of the weed structural strength characteristics. Combined with light weight components and self-retracting jaws that automatically release an uprooted weed, very rapid high volume weed removal can be accomplished. Additional benefits are greatly reduced operator fatigue and virtually no harmful physical stress, phenomena commonly associated with the large amount of energy expended and muscle and joint damaging shock routinely encountered with previous tools. Physical stress is particularly a concern for senior citizens, which I the inventor, as a senior citizen myself, am acutely aware of, having experienced first hand many of the troublesome effects of aging. For many senior citizens in retirement, participation in such open space restoration activities is highly desired but often severely restricted due to the extra stress imposed by conventional tools upon an aging physiology.

The invention accomplishes the goals with a leveraged pair of opposed jaws that firmly grip a weed stem by automatically conforming the jaw surfaces to the natural vertical taper that occurs in all weed stems. Additionally, textured surfaces on the jaws press into the deformable weed stem structural material to increase contact surface area and minimize slippage vertically along the stem. A long handle attached to the end of a lever arm provides leverage for amplified gripping and lifting forces. And a means for retracting the jaws simply by the operator releasing force on the handle allows the jaws to automatically release an uprooted weed. Light weight component materials make the invention easy to carry to a work site and reduce the energy needed to operate it for long periods of time. The combination of those features allows the operator to remain in a comfortable standing position nearly all of the time and to move from weed to weed very rapidly, in contrast to the discomfort and wasted time and energy of unfavorable positions including crouching, bending over, crawling along the ground on hands and knees, or constantly shifting between up and down postures.

An additional beneficial feature is that the components of the tool can be attached with standard removable nut and bolt hardware so that worn or damaged components are easily replaceable by the operator without having to acquire a complete new tool. Consequently the long term cost of ownership and maintenance of the tool is economically advantageous, and much less waste is generated, resulting in reduced negative environmental impact, consistent with open space restoration goals. Attention to these areas of concern are conspicuously absent in previous inventions.

LIST OF REFERENCE NUMERALS 1 frame
2 lever arm assembly
3 handle assembly
4 front jaw
5 rear jaw
6 retractor spring
7 spring retainer pin
8 pivot bolt and nut
10 frame front arm
11 frame top arm
12 frame rear arm
13 frame foot
14 frame pivot hub
15 frame pivot hole
16 frame front jaw upper mounting hole
17 frame front jaw lower mounting hole 18 frame spring upper mounting hole
19 frame spring lower mounting hole
20 lever arm tube
21 left lever arm
22 right lever arm
23 lever arm notch
24 lever arm handle upper mounting hole
25 lever arm handle lower mounting hole
26 lever arm pivot hole
27 lever arm rear jaw mounting hole
28 lever arm and handle upper mounting bolt and nut
29 lever arm and handle lower mounting bolt and nut
31 handle
32 handle adapter
33 handle grip cap
34 handle and handle adapter upper mounting hole
35 handle and handle adapter lower mounting hole
36 handle bottom end taper
37 handle upper mounting bolt and nut
38 handle lower mounting bolt and nut
40 jaw rear surface
41 jaw front surface
42 jaw right mounting rail
43 jaw left mounting rail
44 jaw right corner bracing
45 jaw left corner bracing
46 jaw upper mounting hole
47 jaw lower mounting hole
48 front jaw upper mounting bolt and nut
49 front jaw lower mounting bolt and nut
50 rear jaw mounting bolt and nut
61 spring torsion coil
62 spring front mounting coil
63 spring rear mounting hook
97 weed root
98 weed stem
99 earth

DESCRIPTION OF THE INVENTION

Figure 1:
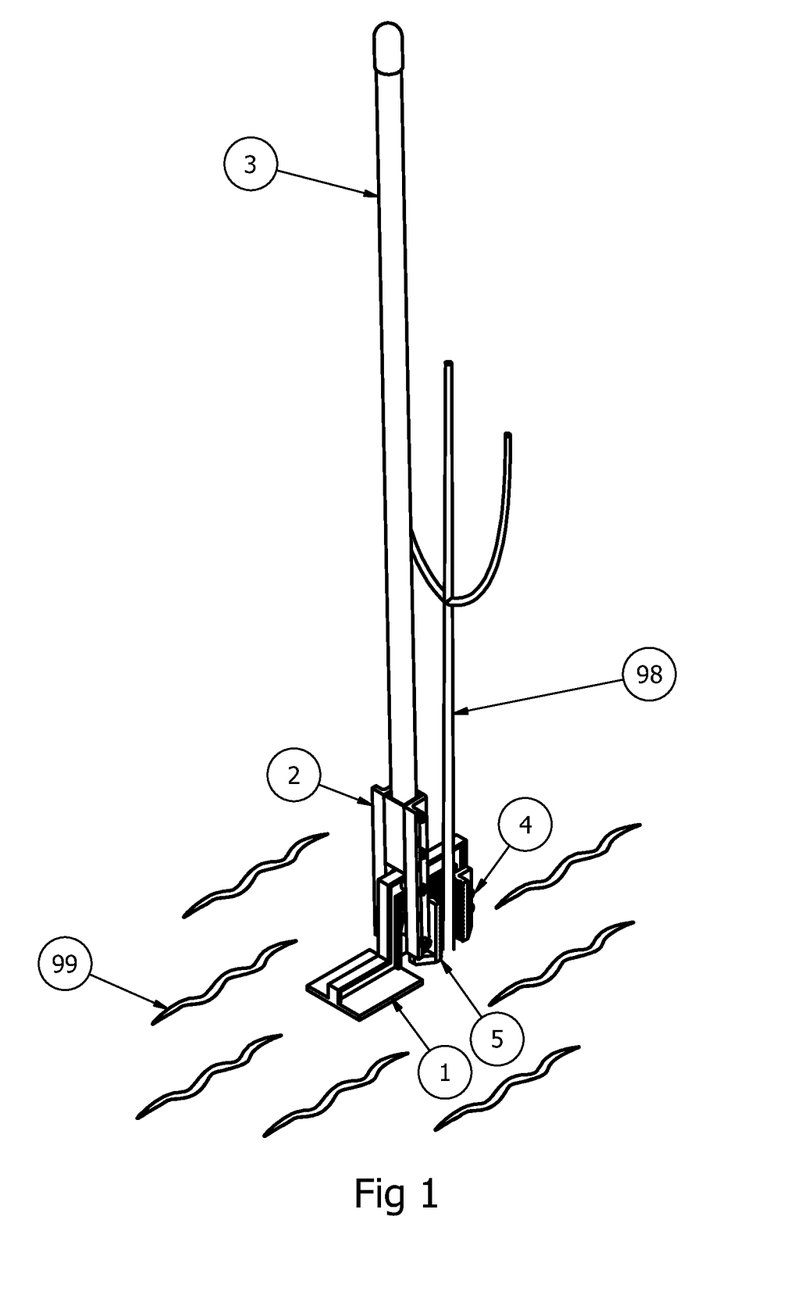
FIG. 1 shows a perspective right rear view of a tool according to the invention with jaws retracted and positioned around a weed stem.

FIG. 1 shows a perspective right rear view of a tool according to the invention. The tool in this embodiment comprises frame 1, lever arm assembly 2, handle assembly 3, and jaws 4 and 5. Wavy lines 99 below the tool represent the earth where the frame foot rests during operation and weed stem 98 represents a weed that the tool removes.

Figures 4, 5, 6:
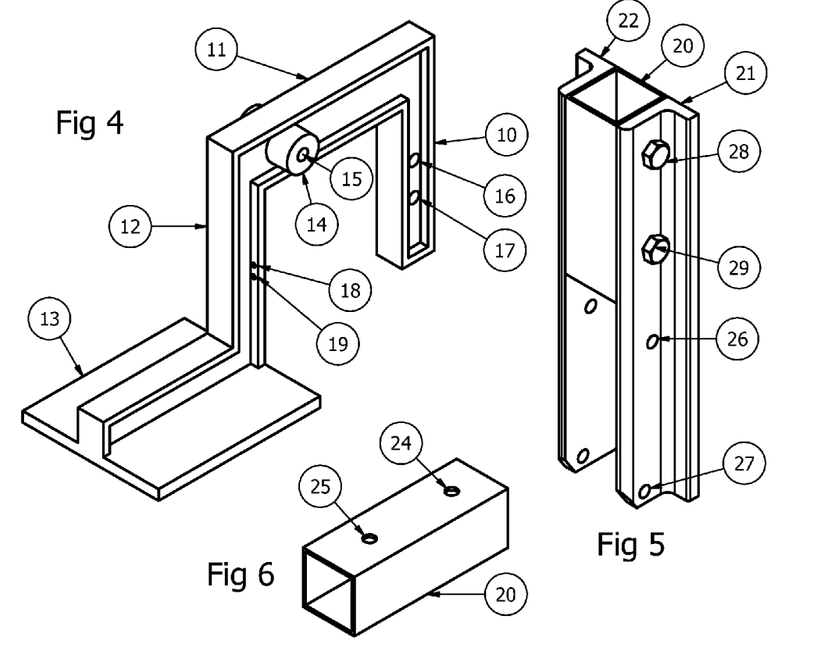
FIG. 4 shows a detail view of the frame of such tool as in FIG. 1.
FIG. 5 shows a detail view of the lever arm assembly of such tool as in FIG. 1.
FIG. 6 shows a detail view of the tube component of the lever arm assembly of such tool as in FIG. 5.

Frame 1 (FIG. 4) is a rigid rectangular form comprising front arm 10, top arm 11, rear arm 12 and an open bottom, with foot 13 extending to the rear from the bottom of rear arm 12. All of the arms are I-beam shaped along their cross-section with a side-to-side dimension of 15.75 mm. Of the side-to-side dimension the central body is 6.25 mm depth and the lips extend 4.75 mm outward from each side of the central body. The front-to-rear dimension for front arm 10 and rear arm 12 is 20 mm, and the top-to-bottom dimension for top arm 11 is 30 mm. The I-beam structure also extends continuously from rear arm 12 across the top of foot 13 with a dimension of 25 mm from the top of the structure to the bottom surface of foot 13. Front arm 10 is 115 mm top-to-bottom, top arm 11 is 125 mm front-to-rear, and rear arm 12 is 130 mm top-to-bottom. The dimensions of foot 13 are 84 mm side-to-side, 100 mm front-to-rear and 6.25 mm top-to-bottom excluding the top I-beam structure. Pivot hub 15 protrudes symmetrically to the sides of the central body of top arm 11 along a circular profile of diameter 20 mm and outward 12.75 mm from each side for a total side-to-side dimension of 31.75 mm. The central axis of pivot hub 14 is positioned 35.5 mm forward from the rear edge and 15 mm up from the bottom edge of frame top arm 11. Pivot hole 15 is 6 mm diameter through pivot hub 14 along the central axis. Front jaw mounting holes 16 and 17 are 6 mm diameter and centered 12 mm forward from the rear edge of frame front arm 10. Hole 17 is centered 30 mm up from the bottom of frame front arm 10 and hole 16 is centered 20 mm up from the center of hole 17. Spring hook mounting holes 18 and 19 are 2.5 mm diameter through the right side lip of frame rear arm 12 and are centered 3 mm inward from the outer edge of the lip. Hole 18 is centered 70 mm down from the top edge of top frame arm 11 and hole 19 is centered 6 mm down from hole 18.

Figure 7:
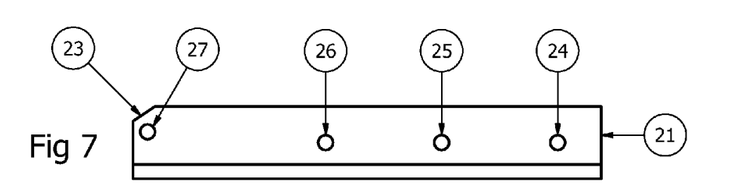
FIG. 7 shows a detail side view of the left side lever arm component of the lever arm assembly of such tool as in FIG. 5.
Figure 8:
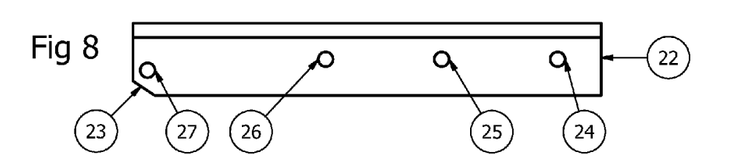
FIG. 8 shows a detail side view of the right side lever arm component of the lever arm assembly of such tool as in FIG. 5.

Lever arm assembly 2 (FIG. 5) is comprised of tube 20, left lever arm 21, right lever arm 22, handle upper bolt and nut 28 and handle lower bolt and nut 29. Tube 20 (FIG. 6) is a 95 mm length of 31.75 mm square 16 gauge mild steel square tube. Holes 24 and 25 are 6 mm diameter through two facing sides of tube 20. Hole 24 center is 20 mm lengthwise from the top end of tube 20, hole 25 is 50 mm below hole 25, and both are centered along the width of tube 20. Left lever arm 21 (FIG. 7) is a 205 mm length of 31.75 mm by 31.75 mm by 6.25 mm aluminum angle extrusion with the face perpendicular to tube 20 trimmed to 20 mm width. Handle upper hole 24 is 20 mm lengthwise from the top end of lever arm 21, handle lower hole 25 is 50 mm below handle upper hole 24 and pivot hole 26 is 50 mm below handle lower hole 25. Holes 24, 25 and 26 are all 6 mm diameter and centered along the face of left lever arm 21 adjacent to tube 20. Jaw hole 27 is 6 mm diameter and centered 6.25 mm from the bottom end of and 11 mm from the outer edge of left lever arm 21. Corner notch 23 is cut from the bottom corner and inset 9.5 mm from the bottom edge and 6.25 mm from the outer edge of left lever arm 21. The width of the face of left lever arm 21 adjacent to tube 20 matches the width of tube 20, and holes 24 and 25 match the size and placement of the corresponding numbered holes in tube 20. Right lever arm 22 (FIG. 8) is a mirror image of left lever arm 21 with identical dimensions, the only difference being that the face perpendicular to tube 20 extends in the opposite direction from that of lever arm 21. The lever arms are assembled on opposite sides of tube 20 and the assembly is secured together with handle assembly 3 by bolts and nuts 28 and 29 through holes 24 and 25.

Figure 9:
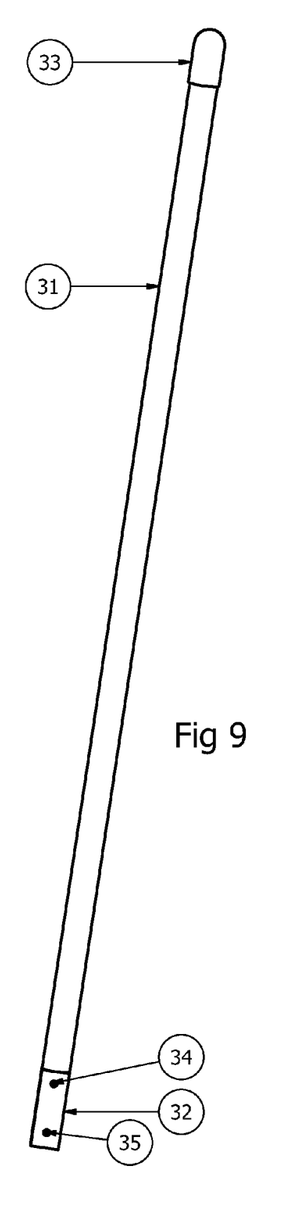
FIG. 9 shows a detail view of the handle assembly of such tool as in FIG. 1.
Figure 10:
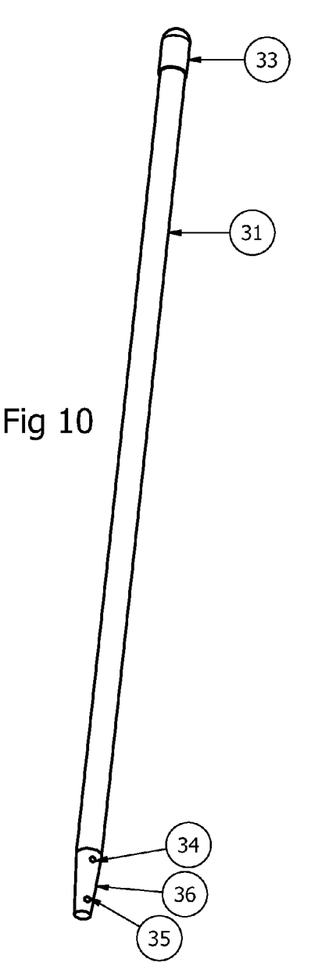
FIG. 10 shows a detail view of the handle component of the handle assembly of such tool as in FIG. 9.
Figure 11:
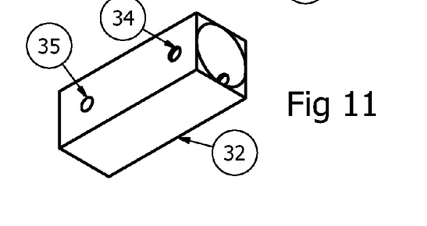
FIG. 11 shows a detail view of the handle adapter component of the handle assembly of such tool as in FIG. 9.

Handle assembly 3 (FIG. 9) is comprised of handle 31, handle adapter 32 and handle grip cap 33. Handle 31 (FIG. 10) is composed of round solid core fiberglass with dimensions 28.575 mm diameter and 1165 mm length. Handle grip cap 33 is inserted over the top end of handle 31 to provide a comfortable and firm grip for the operator. Tapered end 36 extends along the bottom 80 mm length of handle 31 at an angle of about 3.8 degrees relative to the normal exterior handle surface. Holes 34 and 35 in tapered end 36 are 6 mm in diameter and through the central axis of handle 31. Hole 35 is 13 mm from the bottom end of handle 31 and hole 34 is 50 mm upward from hole 35. Handle adapter 32 (FIG. 11) is composed of injection molded plastic and adapts the round tapered end profile of handle 31 to the uniform square profile of tube 20. Handle adapter 32 outer profile has the same dimensions as the inner cavity of tube 20, and its inner cavity has the same dimensions as tapered end 36 of handle 31. Holes 34 and 35 in handle 31 and handle adapter 32 match the size and separation of holes 24 and 25 in lever arm assembly 2.

It should be noted here that a tapered end is currently the only configuration available for the preferred off-the-shelf handle that satisfies light weight, high strength, moderate flexibility and practical cost criteria for the invention. A customized handle would potentially eliminate the tapered end but the component cost would increase to the extent that the tool would not be practical to produce, except possibly at very high volumes. Alternatively the tapered end could be cut off but that would reduce the handle length by 80 mm and result in an undesirable reduction of maximum leverage ratio.

Figure 12:
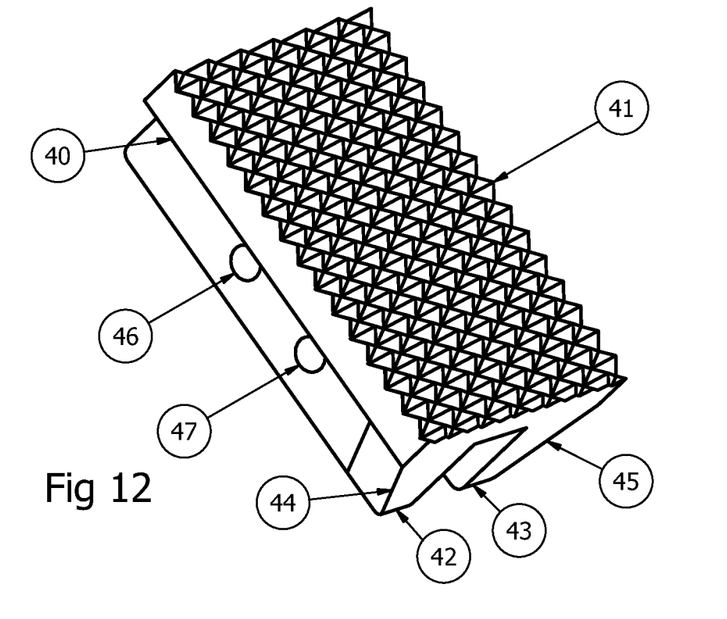
FIG. 12 shows a detail top right front perspective view of a jaw of such tool as in FIG. 1.
Figure 13:
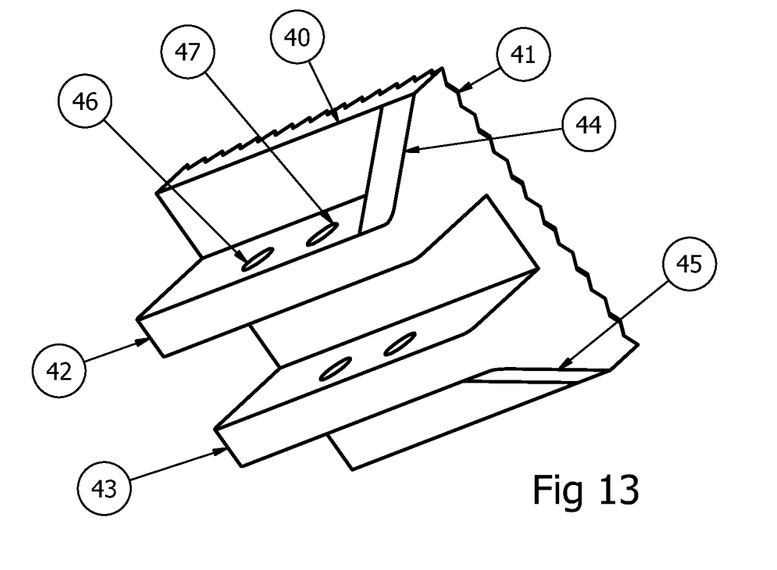
FIG. 13 shows a detail bottom right rear perspective view of a jaw of such tool as in FIG. 1.

Jaw 4 and jaw 5 (FIG. 12) are identical. Front surface 41 and rear surface 40 are 60 mm side-to-side and 80 mm top-to-bottom. The dimension from front surface 41 to rear surface 40 is 9 mm including the textured peaks. Front surface 41 is textured for improved gripping force on deformable plant material. Mounting rails 42 and 43 (FIG. 13) extend the full length top-to-bottom of rear surface 40, and 21 mm perpendicularly outward from the rear surface. The mounting rails are 8 mm wide and positioned symmetrically and parallel to each other on the rear surface with inner faces 15.75 mm apart and outer faces 31.75 mm apart. Corner bracing 44 and 45 at the bottom of rear surface 40 is 10 mm wide and extends from the outer faces of the rails to the rear surface to provide additional strength at critical stress points. Mounting holes 46 and 47 are 6 mm diameter and their centers are 10 mm perpendicularly outward from rear surface 40 and 30 mm from the top and bottom ends of mounting rails 42 and 43, with the critical dimension being that they are centered 20 mm apart from each other.

Figure 2:
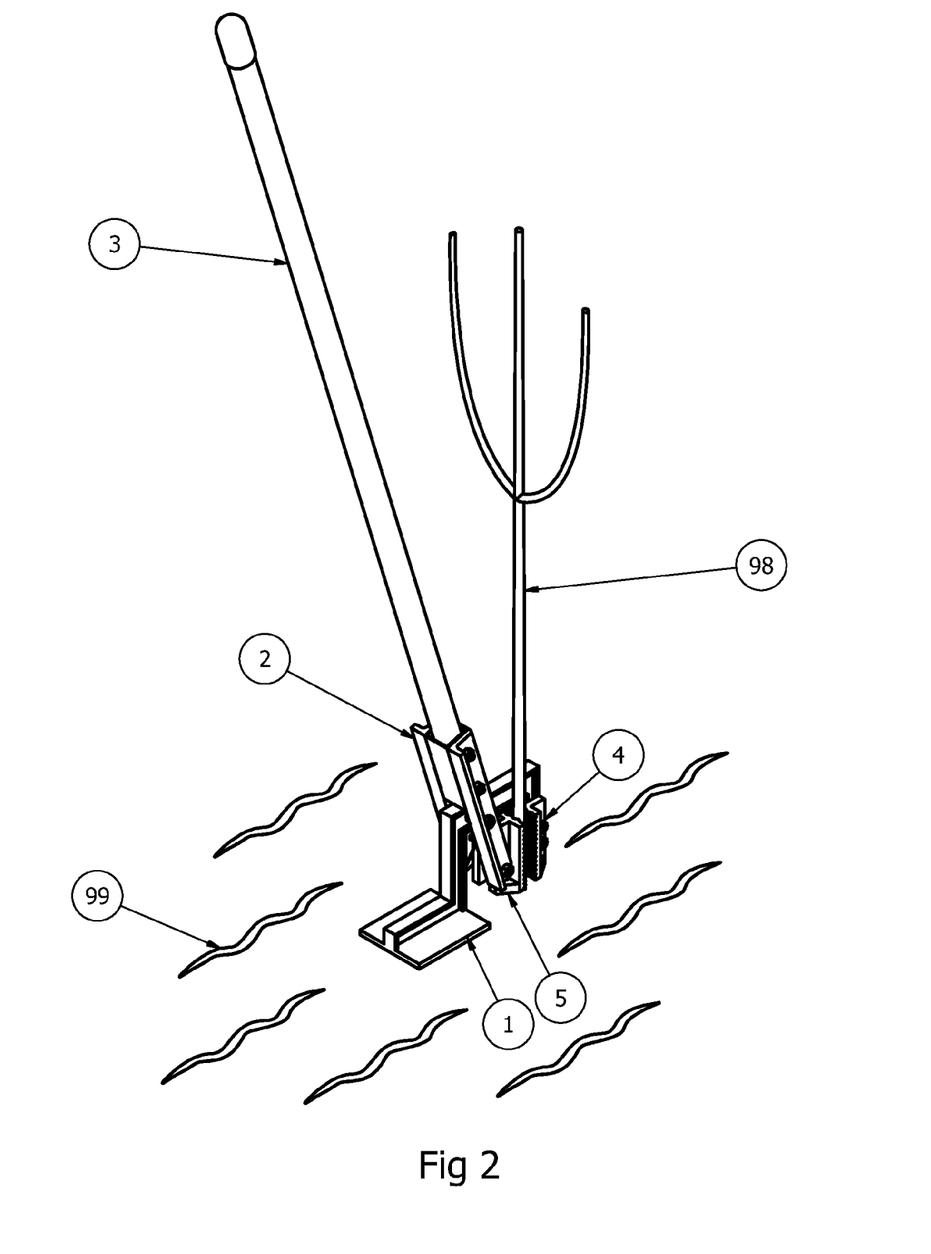
FIG. 2 shows a perspective right rear view of a tool according to the invention with jaws closed and gripping a weed stem.
Figure 3:
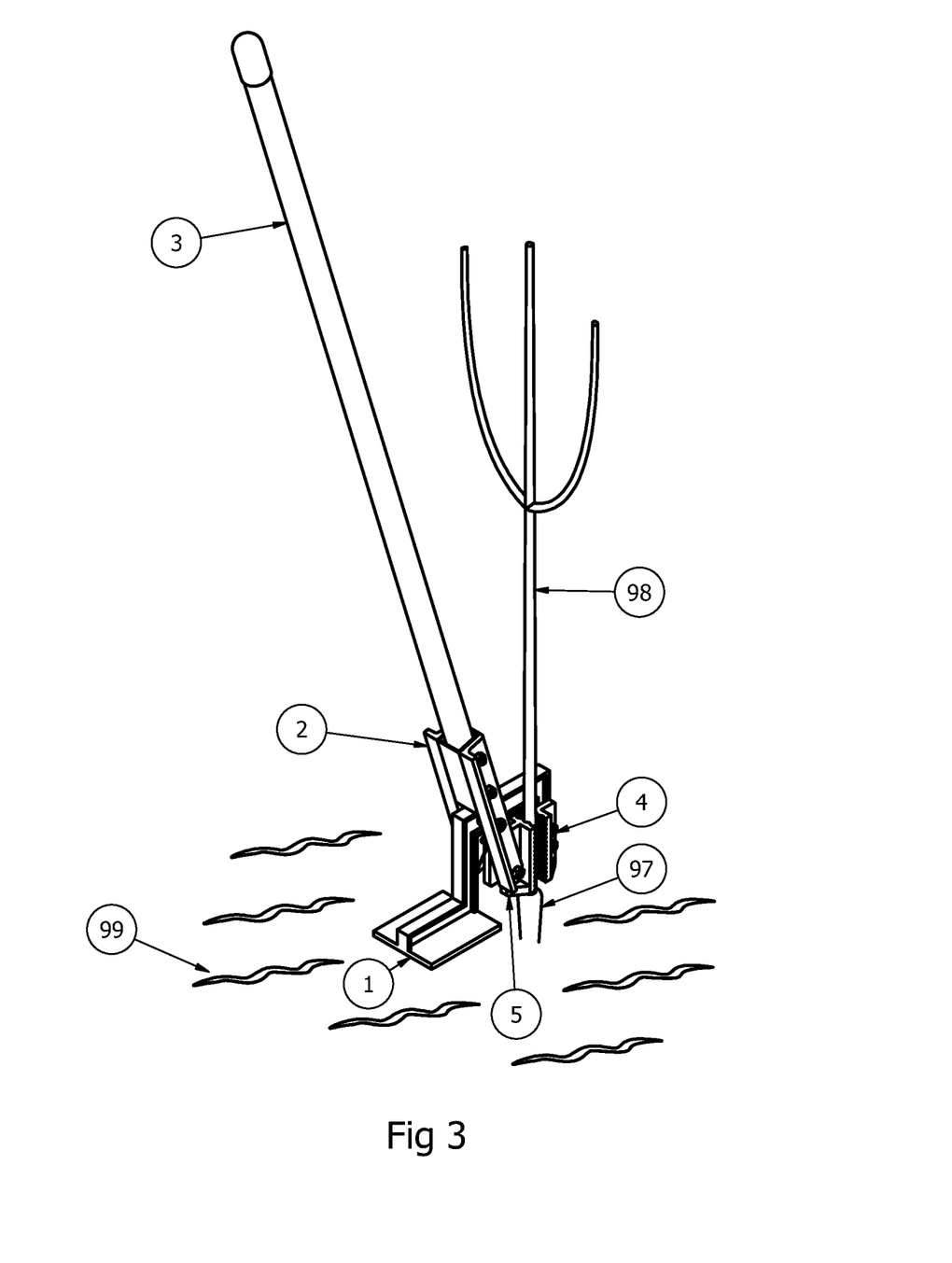
FIG. 3 shows a perspective right rear view of a tool according to the invention with jaws closed, gripping a weed stem and uprooting the weed.

Two additional components in the assembly are not clearly visible in FIGS. 1-3, spring 6 and spring retainer pin 7, because they are obscured by lever arm assembly 2. Detail views of the tool head with jaws open (FIG. 14) and jaws closed (FIG. 15) expose the spring components. Retractor spring 6 (FIG. 16) is a custom wound torsion spring made of 1 mm diameter music wire. Torsion coil 61 is 4 coils with 6 mm inside diameter. Front mounting coil 62 is 3 coils with 6 mm inside diameter at the end of a straight leg of 32 mm length extending from torsion coil 61. Rear mounting hook 63 is one half coil with 5 mm inside diameter at the end of a straight leg of 32 mm length extending from torsion coil 61. The legs cross over each other at an angle of about 30 degrees. Spring retainer pin 7 (FIG. 17) is a solid rod of mild steel 6 mm diameter and 31 mm length.

All bolts are hex cap M6×1 thread and each is secured with an M6×1 thread nylon insert lock nut. Front jaw 4 is mounted on the rear side of frame front arm 10 with the front surface facing toward the rear and is secured with bolts 48 and 49 of length 40 mm. Lever arm assembly 2 and handle assembly 3 are secured together with bolts 37 and 38 of length 50 mm. Lever arm assembly 2 is secured to the frame pivot hub with bolt 38 of length 50 mm. The lock nut for bolt 38 is tightened to the point where both bolt and nut make superficial contact with lever arm assembly 2 but allow freedom of movement for the lever arm assembly to pivot on frame 1. Jaw 5 is secured to lever arm assembly 2 with bolt 50 of length 40 mm through the jaw lower mounting hole. The lock nut for bolt 50 is tightened to the point where both bolt and nut make superficial contact with the outer faces of jaw 5 mounting rails but allow freedom of movement for the jaw to pivot on lever arm assembly 2.

Retractor spring 6 is mounted between jaw 5 and frame rear arm 12. Spring rear hook 63 is inserted into frame spring mounting holes 18 and 19 with spring torsion coil 61 positioned upward. Spring retainer pin 7 is inserted through upper mounting hole 46 of rail 42 of jaw 5, then through spring front mounting coil 62 and finally into upper mounting hole 46 of rail 43 of jaw 5 so that spring mounting hook 62 is positioned between jaw 5 rails 42 and 43. Spring retainer pin 7 is press-fit into the jaw 5 mounting holes and is held in place by friction. Spring retainer pin 7 length is slightly less than the distance between the outer faces of the jaw mounting rails so that when fully inserted both ends are inset slightly from the mounting rail faces to avoid interference with movement of the mounting rails between the arms of lever arm assembly 2 during operation of the tool.

OPERATION OF THE INVENTION

Operation of the tool begins in rest position. In rest position no force is applied to handle 31 and the jaws are opened by retractor spring 6 as follows. Retractor spring 6 pulls spring retainer pin 7 toward frame rear arm 12, so that the top of jaw 5 moves toward frame rear arm 12 and lever arm assembly 2 while jaw 5 pivots on bolt 50. When jaw 5 rear surface 40 comes into contact with lever arm assembly 2, the top of jaw 5 cannot move any further relative to lever arm assembly 2. Retractor spring 6 then continues to pull jaw 5 and the bottom end of lever arm assembly 2 together toward frame rear arm 12 while lever arm assembly 2 pivots on bolt 8. When lever arm assembly 2 comes into contact with rear arm 12 of frame 1, the bottom end of lever arm assembly 2 cannot move any further relative to frame rear arm 12. This is the rest position where the jaws are open to maximum separation from each other.

Figures 14, 15, 16, 17:
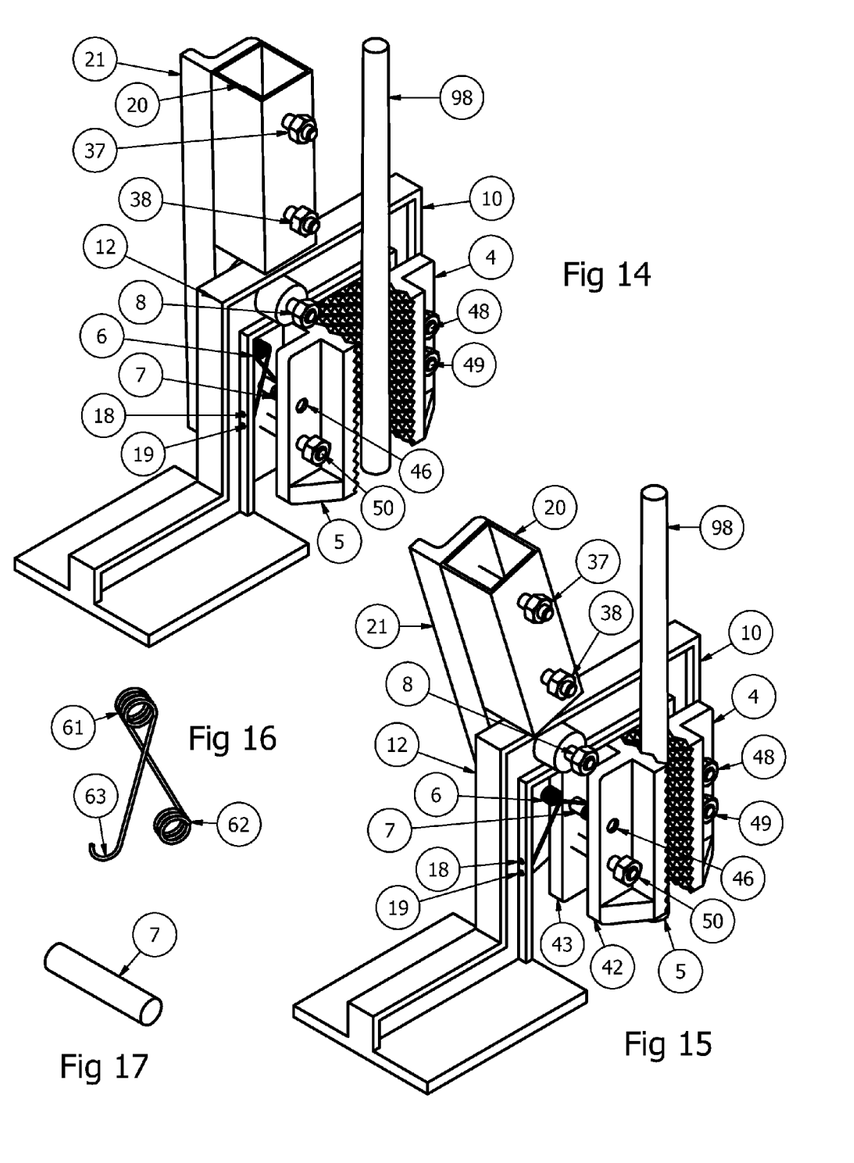
FIG. 14 shows a detail view of the head of such tool as in FIG. 1 with the jaws open and the retractor spring and spring retaining pin exposed.
FIG. 15 shows a detail view of the head of such tool as in FIG. 2 with the jaws closed and with the retractor spring and spring retaining pin exposed.
FIG. 16 shows a detail view of the retractor spring of such tool as in FIG. 14.
FIG. 17 shows a detail view of the spring retaining pin of such tool as in FIG. 14.

To remove a weed, the tool is placed in rest position with foot 13 flat on earth 99 and with weed stem 98 between open jaws 4 and 5 (FIGS. 1, 14). For the most efficient operation the tool should be placed so that jaw 4 is initially in contact with weed 98 so that jaw 5 can close completely without the tool sliding on the foot to make contact between jaw 4 and weed stem 98 as described further below.

The operator applies force to handle 31 toward the rear of the tool which causes lever arm assembly 2 to pivot on bolt 8 so that the top part of lever arm assembly 2 moves toward the rear of frame 1 and the lower part of lever arm assembly 2 moves toward the front of frame 1. As the lower part of lever arm assembly 2 moves forward it pushes jaw 5 forward until the bottom edge of jaw 5 front surface 41 is in contact with weed stem 98. As handle 31 continues to pivot on bolt 8, jaw 5 pivots on bolt 50 so that the top part of jaw 5 moves toward the front of frame 1, counteracting the pull of retractor spring 6 on retainer pin 7. When jaw 5 pivots sufficiently, front surface 41 makes full contact with and conforms to the taper of weed stem 98 (FIGS. 2, 15), achieving maximum surface contact with weed stem 98. At that point jaw 5 cannot pivot any further.

If the tool was placed initially so that jaw 4 is not already in contact with weed 98 as indicated previously for most efficient operation of the tool, continued force on handle 31 causes the tool to slide on frame foot 13 across earth 99, moving jaw 4 toward weed stem 98 until it makes contact with weed stem 98. Continued force on handle 31 results in tightening of jaw 4 and jaw 5 on weed stem 98, compression of weed stem 98 structural material and intrusion of textured surfaces 41 peaks into weed stem 98 surface, further increasing gripping force and stability on weed stem 98. With continued increase of force on handle 31 an equilibrium point is reached where compression, intrusion and foot movement cease and weed stem 98 is gripped optimally between jaw 4 and jaw 5.

At that point frame 1 begins to pivot on the bottom rear edge of foot 13 (FIG. 3), lifting the front end of frame 1 above earth 99 with weed stem 98 still gripped firmly between jaw 4 and jaw 5, consequently pulling weed root 97 out of earth 99.

The operator then releases the force on handle 31, and the tool returns to rest position with the jaws fully opened as described previously, releasing the uprooted weed and automatically prepared for the next operation on another weed.

Automatic jaw retraction and release of the uprooted weed permits rapid repetition of tool operation. For example in the first timed test with a prototype model of the tool in a dense field of Teasel and Poison Hemlock plants ranging from about 120 cm to 200 cm tall, approximately 800 plants complete with roots were removed in 2 hours, on the order of 10 times as fast as the best rate at which such plants can normally be removed with generic pick and shovel tools.

SEQUENCE LISTING

Not Applicable

I claim:

1. A tool for removing plants including a root from ground level using applied leverage with a plant stem gripped from above the ground level and with no ground penetration comprising:
   a) A frame enclosing three sides of a rectangular enclosure with an open side facing downward and a horizontal extension leading outward from a bottom of a rear segment toward a rear direction and in a plane of the rectangular enclosure,
   b) A foot attached to the bottom of the horizontal extension at the rear of the frame and oriented parallel to the ground when the frame enclosure is oriented upright with the open end toward the ground,
   c) A first jaw attached in a fixed position to a front segment of the frame enclosure with a gripping surface facing toward the rear segment of the frame enclosure, and oriented perpendicular to the plane of the frame enclosure,
   d) A lever arm attached to a top segment of the frame by a rod or bolt upon which the lever arm pivots on the frame with pivotal motion in the plane of the frame enclosure so that an end of the arm that extends inside of the frame enclosure can move freely between the front and rear segments of the frame enclosure,
   e) A second jaw attached to the end of the lever arm that extends inside of the frame enclosure, and oriented perpendicular to the plane of the frame enclosure with a gripping surface facing toward the front of the frame enclosure so as to be in opposition to the first jaw as mentioned above, and movable in proximity to the first jaw as the lever arm pivots on the frame,
   f) An elongated handle attached to the end of the lever arm that extends outside of the frame enclosure.

2. The tool of claim 1, wherein the second jaw pivots about an attachment point on the lever arm so that a vertical orientation of the gripping surface relative to the gripping surface of the first jaw is variable and compels the jaws to conform to a natural vertical taper of the plant stem to achieve maximum practical surface contact with the plant stem and maximum practical gripping force.

3. The tool of claim 1, wherein the gripping surfaces of the jaws are textured to achieve superior stability of the jaws against the plant stem and prevent slippage.

4. The tool of claim 1, wherein the frame, lever arm, handle and jaws may all be attached together with removable hardware so that all of the components may be replaceable.

5. The tool of claim 1, wherein a spring is attached between the second jaw and the rear segment of the frame enclosure so that when no force is applied to the lever arm through the handle the second jaw is compelled to automatically retract away from the first jaw and to move to a position where the jaws are at maximum possible separation from each other.

6. The tool of claim 5, wherein the spring is replaceable.

\* \* \* \* \*